April 16, 1929.　　　G. M. CLASS　　　1,709,118
LATHE
Filed Sept. 30, 1927　　　9 Sheets-Sheet 2

Fig. 2

Inventor:
George M. Class
By Fisher, Towle, Clapp & Soans Attys.

April 16, 1929.　　　G. M. CLASS　　　1,709,118

LATHE

Filed Sept. 30, 1927　　　9 Sheets-Sheet 4

Inventor
George M. Class
By Fisher, Towle, Clapp & Soans, Attys.

April 16, 1929.　　　G. M. CLASS　　　1,709,118
LATHE
Filed Sept. 30, 1927　　　9 Sheets-Sheet 6

Fig. 8

Inventor
George M. Class
By Fisher, Towle, Clapp - Soans. Attys.

April 16, 1929.  G. M. CLASS  1,709,118
LATHE
Filed Sept. 30, 1927    9 Sheets-Sheet 9

Inventor
George M. Class
By Fisher, Towle, Clapp & Soans, Attys.

Patented Apr. 16, 1929.

1,709,118

UNITED STATES PATENT OFFICE.

GEORGE M. CLASS, OF MADISON, WISCONSIN, ASSIGNOR TO GISHOLT MACHINE COMPANY, OF MADISON, WISCONSIN, A CORPORATION OF WISCONSIN.

LATHE.

Application filed September 30, 1927. Serial No. 223,166.

This invention relates to lathes and more particularly to lathes and other machine tools of a similar nature, which are provided with a tool post and tool post carriage or apron, the former being mounted so as to be slidable crosswise of the bed of the lathe, and the latter being mounted so as to be slidable lengthwise of the lathe. The present invention is also applicable to lathes having, in addition to the above referred to tool post and tool post apron, a turret and turret apron, the latter being mounted on the lathe bed so as to be movable longitudinally of the lathe bed.

In the art of lathes and the like, the longitudinal movement which is imparted to the tool post apron or turret apron and the crosswise movement of the tool post, when operating on the work, is usually referred to as "feed" movement, and this may be either hand feed or power feed. The same movement when accelerated for quickly moving the respective parts, to or from the vicinity of the work, is usually referred to as "rapid traverse" movement. These terms, where hereinafter used, will be accordingly construed and understood.

Among the objects of the invention are; to provide, in a manually controlled lathe, improved means for controlling the power feed mechanism and power traverse mechanism, which means will be effective to automatically throw out or disengage the power feed mechanism when the power traverse mechanism is engaged, to provide, in cooperation with said throw-out means, means including an adjustable member carried by the tool post main slide for actuating said throw-out means at any predetermined point in the travel of the main slide, and to provide, in association with said throw-out means, means including an adjustable member carried by the tool post cross-slide, to automatically actuate said throw-out means at any predetermined point in the travel of said cross-slide.

A still further object of the invention is to provide, in association with the power feed throw-out mechanism, improved means for preventing rotation of the usual hand feed wheel or spider when the power rapid traverse is thrown in, this latter object relating more particularly to the hand wheel or spider provided for manually effecting longitudinal movement of the turret slide.

It is a general object of the present invention to provide an improved machine of the class described, and other objects and advantages of the invention will be understood by reference to the following specification and accompanying drawings in which I have illustrated a part of a lathe embodying a selected form of the invention, and in which drawings:

Figure 1:
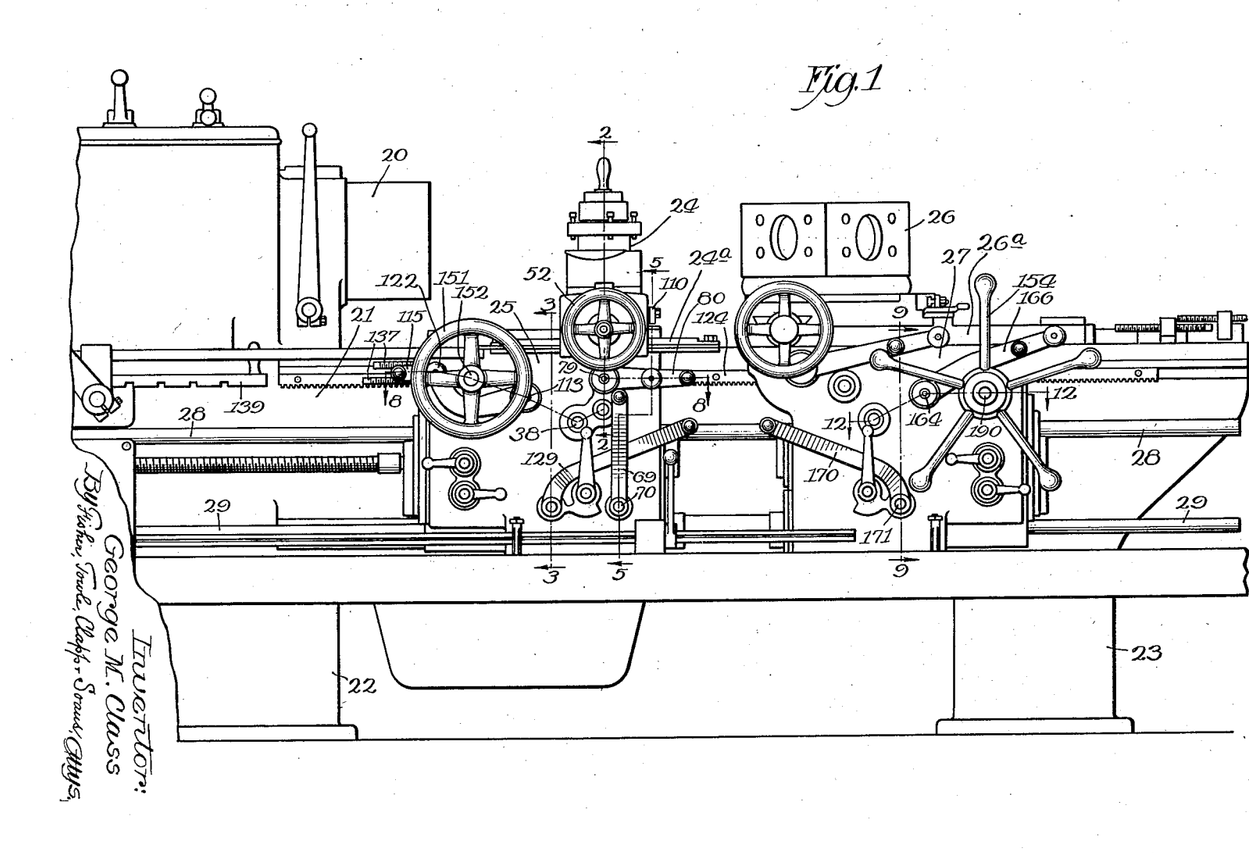
Fig. 1 is a front elevation of a part of a lathe embodying my improvements.
Figure 13:
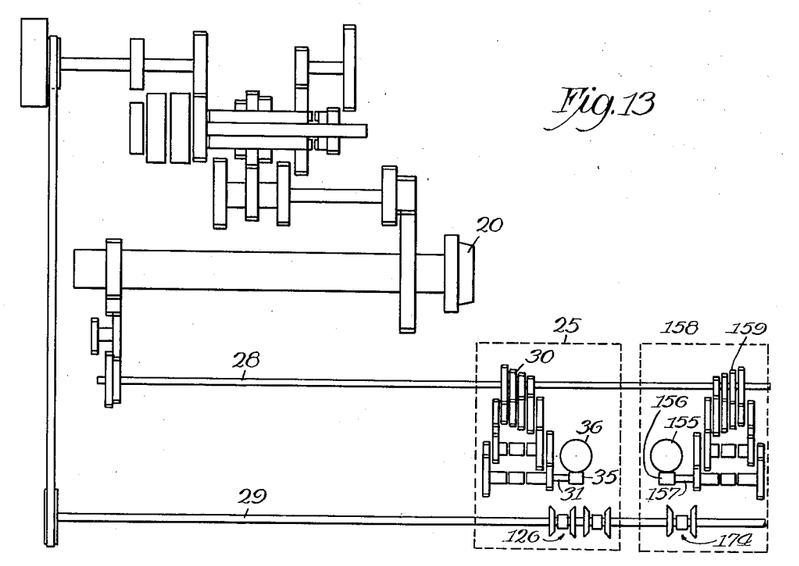
Fig. 13 is a diagrammatic view, illustrating the transmission of power to the various parts of the lathe.
Figure 14:
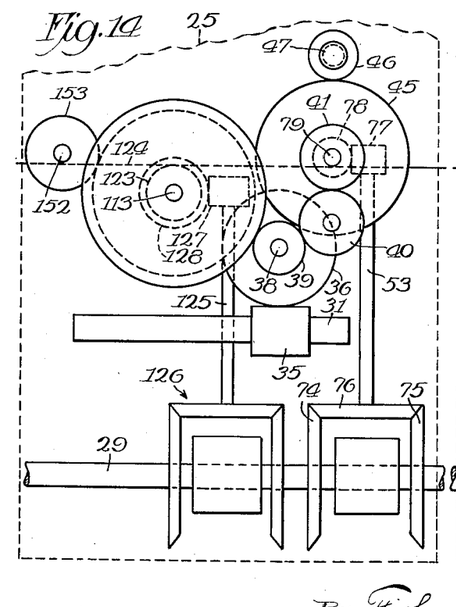
Figs. 14 and 15 are diagrammatic views illustrating the power transmission mechanism in the tool post apron, and turret apron, respectively.

Referring now more particularly to Fig. 1 of the drawings, I have shown a lathe embodying a spindle or work holding element 20, which is rotatably driven in any approved manner, such as diagrammatically shown in Fig. 13. The driving mechanism for this element may be of any standard construction, and forming no part of the present invention, need not be specifically described. The spindle 20 is mounted on a bed 21 which is supported by suitable means such as legs 22 and 23 at its opposite ends.

The tool post cross slide 24 is mounted on a main slide 24ᵃ which carries an apron 25, said slide 24ᵃ being mounted on the bed 21 of the lathe so as to be slidable longitudinally thereof, the tool post cross-slide 24 being mounted on the slide 24ᵃ so as to be slidable thereon crosswise of the lathe bed. I also provide a turret 26 rotatably mounted on a slide 26ᵃ carrying an apron 27, the said slide 26ᵃ being mounted on the lathe bed so as to be slidable longitudinally thereof in accordance with usual practice.

According to the present invention, I provide a rack fixedly mounted on the bed of the lathe and a pinion rotatably mounted in each of the above described aprons, and meshing with the rack for effecting longitudinal sliding movement of the respective slides and aprons along the bed. The present invention includes mechanism for selectively effecting either slow or rapid rotation of the pinion by power driven mechanism, the slow rotation of the pinion serving to feed the respective slides, i. e., move the slides along the bed slowly as required when operating upon the work, and rapid rotation of the pinions serving to effect rapid traverse of the slides, i. e., to quickly move the respective slides to or from the immediate vicinity of the work to be operated upon. I also provide a hand wheel or spider for effecting rotation of the pinion in each apron, thereby to manually feed the respective slides along the bed, the speed of the feed being then dependent on the rapidity with which the hand wheel or spider is rotated. For feeding the tool post crosswise of the bed, I provide three forms of drive, namely, power drive for feeding the tool post slowly as required when operating upon the work, power drive for effecting rapid traverse of the tool post for quickly moving the same to or from the work and a for hand wheel manually effecting the said crosswise movement.

I will now proceed to describe in detail the mechanism for effecting crosswise movement of the tool post.

By reference to Fig. 13 it will be seen that there are a pair of power driven shafts 28 and 29 which are driven by suitable connections to the spindle driving mechanism. The shaft 28 is connected by a suitable speed changing mechanism 30, to a shaft 31 which is rotatably mounted in the tool post carrying apron 25, the latter being slidably mounted on the bed 21 of the lathe in any suitable manner, as indicated at 32, 33 and 34 in Figs. 3 and 5. A worm gear 35 is keyed to the driven shaft 31 so as to rotate therewith and meshes with a worm wheel 36 which is keyed to a sleeve 37, the latter being rotatably mounted on a fixed shaft 38. The shaft 38 is fixedly mounted in suitable bearings provided in the apron so that the sleeve 37 rotates thereon and the said sleeve is provided adjacent its opposite end with gear teeth forming a pinion 39.

Figure 7:
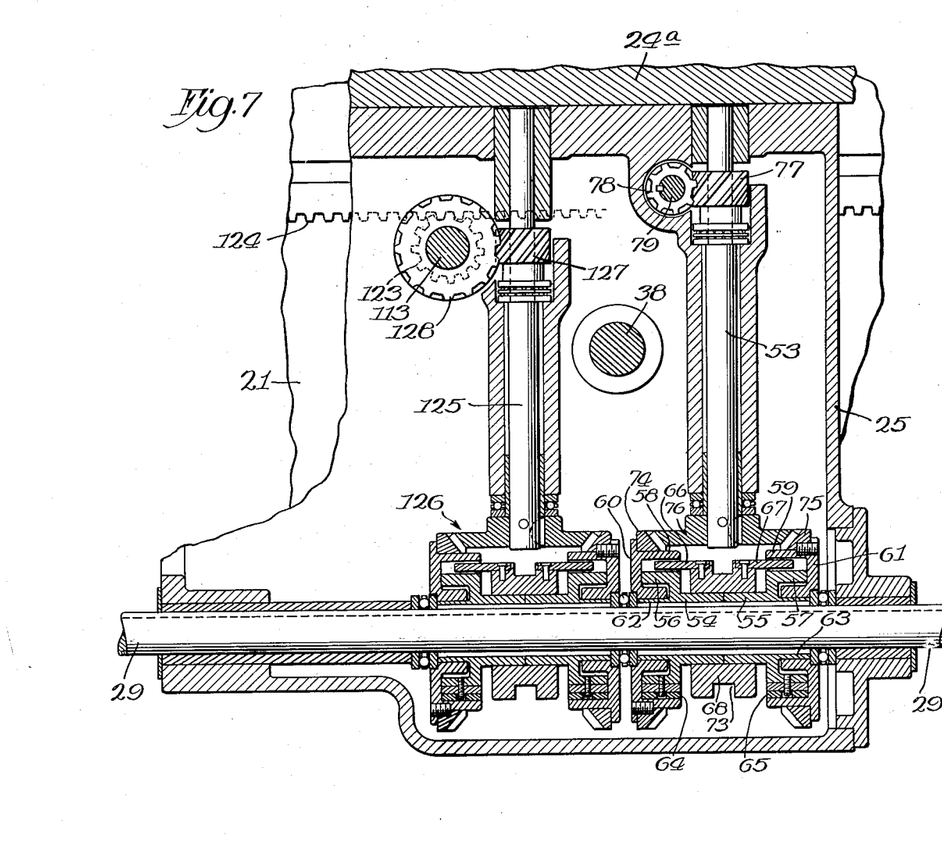
Fig. 7 is a section on the line 7—7 of Figs. 3 and 5.

For effecting crosswise feed movement of the tool post, a pinion 40 (Fig. 2) is rotatably mounted in the apron in mesh with the pinion 39, and also with another pinion 41 having a shank 42 on which is secured, so as to rotate therewith, a clutch part 43. The clutch part 43 is adapted to engage a coacting clutch part 44, which is provided with an annular gear 45, and this annular gear meshes with a pinion 46, which is keyed to a feed screw 47. The gear 41 and clutch parts 43 and 44 are mounted on a shaft 79 which is rotatably mounted in the apron, in bearings provided therefor. The feed screw 47 is connected to the tool post cross-slide 24 in any suitable manner as shown at 48 in Fig. 2, so as to be rotatable but fixed in longitudinal relation thereto. The screw 47 threadedly engages a relatively fixed nut 49 which is mounted on a portion of the main slide 24ᵃ so as to be movable therewith. The pinion 46 is keyed to the screw 47 by means of a key 50 engaging a keyway 51 in the screw and a suitable keyway in the pinion so as to be non-rotatable relative thereto but so as to be slidable axially thereof. It will be seen that rotation of the pinion 46 will be effective to rotate the screw 47 and that the screw will then be caused to move longitudinally relative to the nut 49, thereby to feed the tool post crosswise of the bed through the connection 48 between the screw and tool post. It is to be noted that the above described mechanism is operable to effect the power feed of the tool post crosswise of the lathe bed. A hand wheel 52 is secured to the outer end of the screw for permitting manual rotation of the screw when desired. Rapid traverse of the tool post crosswise of the bed of the lathe is effected by means of certain mechanism driven through the agency of the power driven shaft 29. In Fig. 7 I have shown a form of clutch mechanism for transmitting rotation from the power shaft 29 to a vertical shaft 53 which is rotatably mounted in the tool post apron 25. This mechanism includes a pair of oppositely facing members 54 and 55, keyed to the power shaft 29 so as to be rotated therewith but slidable longitudinally thereof, and each provided with annular flange portions as at 56 and 57 respectively, which flange portions are adapted to be frictionally engaged with similar annular flanges 58 and 59 of a pair of members 60 and 61. The members 60 and 61 are rotatably mounted on bearing portions 62 and 63 of the members 54 and 55 respectively. The means for frictionally engaging the respective clutch parts may be of any suitable form, and in the present instance includes bands 64 and 65 of friction material which are disposed in the annular spaces between the annular flanges 56—58 and 57—59 respectively. Wedge members 66 and 67 carried by the sliding collar 68 are adapted to be forced inwardly between adjacent ends of the respective friction bands to thereby spread the bands so as to cause them to tightly engage the annular flange of the outer clutch part. The bands are, of course, secured at some suitable point to the inner clutch parts, as best shown in Fig. 7.

For shifting the collar 68, I provide a hand lever 69 (Fig. 5) secured adjacent its lower end to a shaft 70 rotatably mounted in the apron 25 and provided on its inner end with an arm 70′ having a depending portion 71 which carries a fork 72, which fork is disposed in an annular groove 73 provided in the collar 68. It will be seen that by shifting the hand lever 69 one way or the other, one of the clutch parts 58 or 59 will be operatively connected to its coacting clutch part so as to be driven with the shaft 29, the direction of rotation of the shaft 53 depending upon which of the beveled gears 74 and 75 is clutched to the shaft 29. The beveled gear rings 74 and 75 are keyed to the respective clutch parts 60 and 61 in any suitable manner so as to rotate therewith. The beveled gear members 74 and 75 mesh with a beveled gear member 76 which is keyed to the lower end of the vertically extending shaft 53, and hence the shaft 53 will be rotated when the hand lever 69 is moved from its neutral position to either side so as to operatively engage one of the clutches.

A spiral gear 77 (Figs. 7 and 8) is secured to the upper end of the shaft 53 and meshes with a spiral gear 78, which is keyed to the inner end of the shaft 79. The clutch part 44 which is provided with the gear 45 in mesh with the pinion 46 is keyed to the shaft 79, and it will be observed that when the shaft 53 is rotated, the shaft 79 will also be rotated so that the gear 45 will impart rotation to the pinion 46, thereby to effect turning of the screw 47 and consequent crosswise movement of the tool post. The speed of rotation of the shaft 29 and the various gear ratios which effect the transmission of rotation therefrom to the pinion 46 are such that the pinion 46 will be rotated considerably faster when driven by the shaft 29 than when driven by the shaft 28. Hence the shaft 29 serves to provide power for effecting rapid traverse of the tool post crosswise of the lathe bed while the shaft 28 serves to provide power for feeding the tool post crosswise of the bed.

Figure 2:
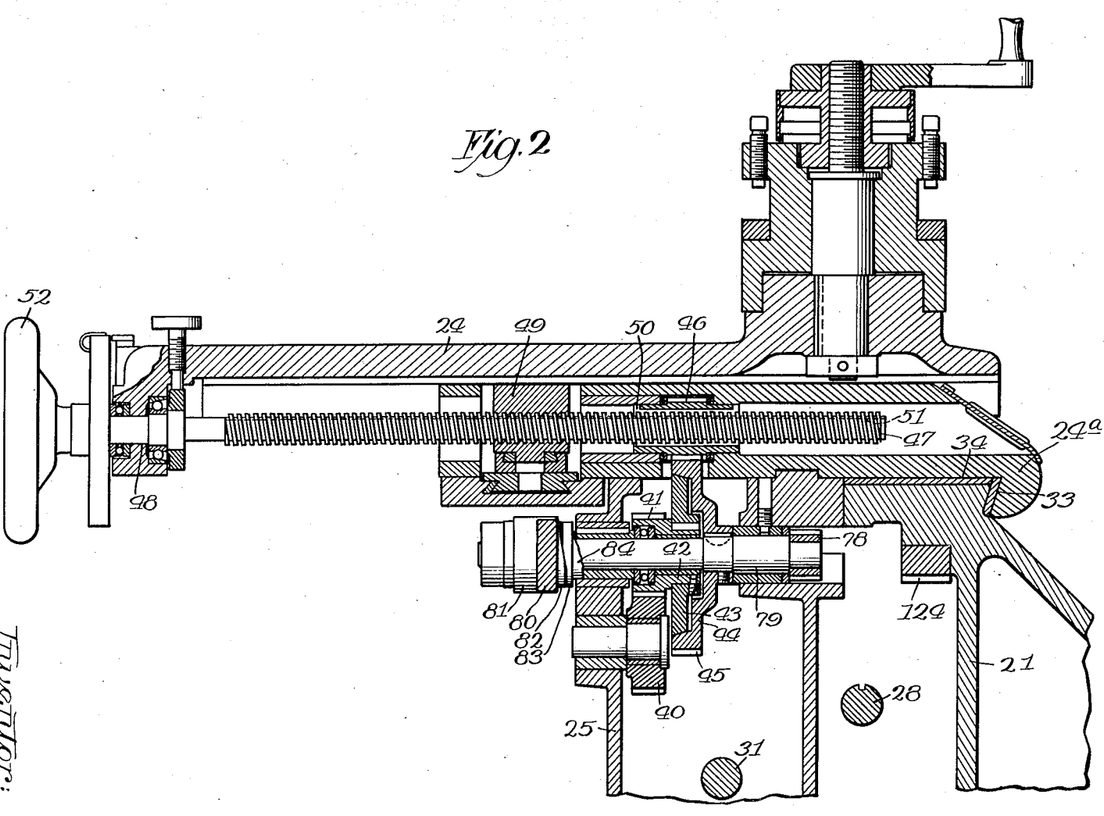
Figs. 2 and 3 are sections on the line 2—2 and 3—3 respectively of Fig. 1.
Figure 8:
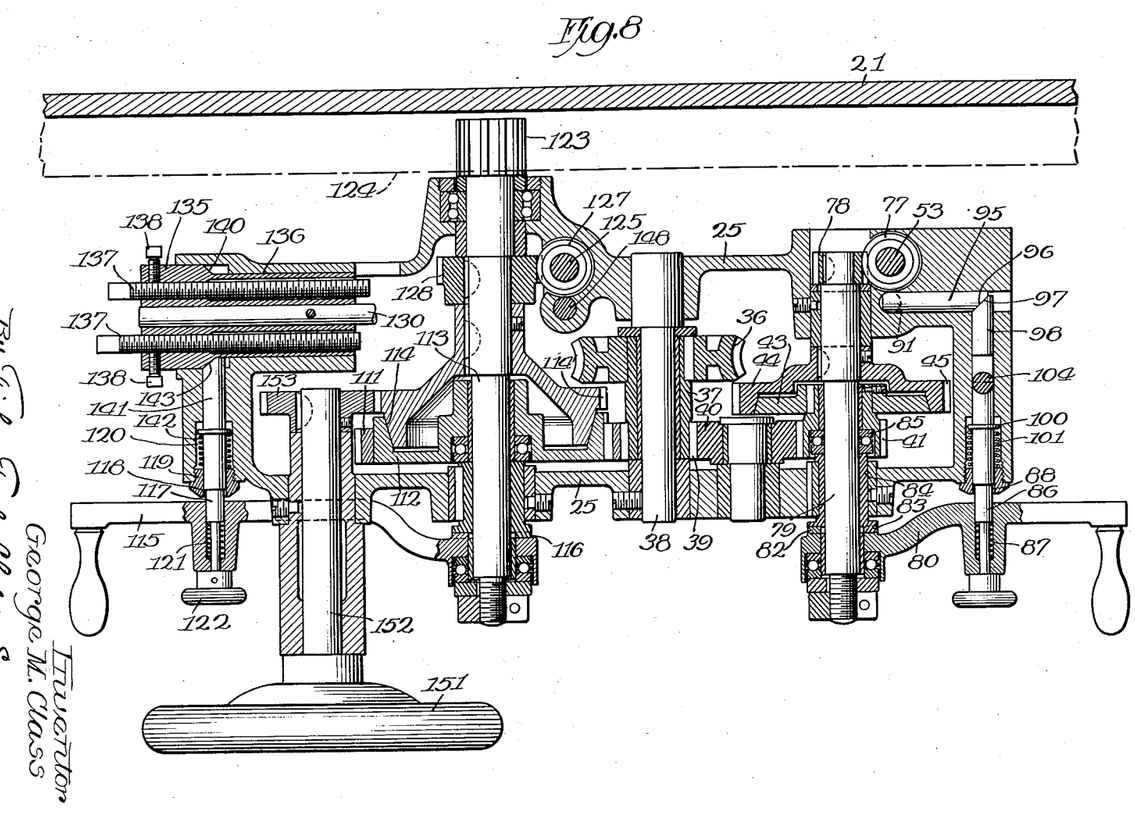
Fig. 8 is a development view in section, taken on the line 8—8 of Fig. 1.

For controlling the clutch members 43 and 44, I provide a hand lever 80 rotatably mounted adjacent the outer end of the shaft 79. The hub 81 of the hand member 80 is provided with an inwardly facing cam portion 82 (Fig. 2) adapted to cooperate with an outwardly facing cam portion 83 on a sleeve 84 which is slidable axially of the shaft 79. A thrust bearing 85 is interposed between the inner end of the sleeve 84 and an outwardly facing shoulder on the gear member 41, which carries the inner clutch part 43. It will be seen that by lifting the handle to operative position as shown in Figs. 1, 2 and 8, the co-acting cam parts 82 and 83 will effect frictional engagement between the clutch parts 43 and 44 so that the screw 47 will be rotated by the shaft 28 and interposed connecting gears. For maintaining the hand lever 80 in operative position, I provide a spring-pressed plunger 86 mounted in the handle, normally urged outwardly by a spring 87 and into an aperture 88 provided in the apron 25. The lever 80 may be released from its operative position by simply pulling the plunger 86 out of engagement with the aperture 88 against the pressure of the spring 87.

It is desirable to provide means for effecting disengagement of the feed driving mechanism when the rapid traverse driving mechanism is engaged. For this purpose, I provide the arm 70′ with an upwardly extending portion 89 (Figs. 5 and 6) having a substantially V-shaped notch 90 in its upper end. A vertically disposed rod 91 slidably mounted in the apron engages the V-shaped notch 90, the lower end of the rod being provided with a similarly V-shaped end portion 92. The upper end of the rod 91 is beveled as shown at 93 to engage a similarly beveled end 94 of a slidably mounted rod 95, which at its other end is beveled as shown at 96 (Fig. 8) to engage the beveled end 97 of a spring pressed and slidably mounted rod 98. The rod 98 is provided with a collar 100 (Figs. 5 and 8) secured thereto, and a spring 101 is compressed between the collar 100 and the inner end of a nut 102, which threadedly engages the outer end of a recess 103 in the apron in which the spring 101 is disposed about the rod. The nut 102 is apertured as clearly shown in Figs. 5 and 8 to provide the aperture 88 in which the locking pin 86 engages for holding the hand lever 80 in its up position. When the lever 69 is moved to effect rotation of the shaft 53 in either direction, it will be seen that the rod 91 will be raised by one of the inclined sides of the V-shaped notch 90, the rod 95 will be moved endwise and the spring pressed rod 98 forced outwardly against the pressure of the spring 101, thereby to force the spring pressed plunger 86 out of the aperture 88 and permit the hand lever 80 to swing downwardly by gravity, whereby the clutch members 43 and 44 are disengaged to prevent rotation of the shaft 79 through the agency of the feed power shaft 28 and driven shaft 31. When the hand lever 69 is restored to neutral position the spring 101 serves to restore the system of rods to neutral position.

Crosswise feeding of the tool post may conveniently be automatically tripped out by means of a vertically disposed rod 104 slidably mounted in the tool post apron and slide and having a beveled lower end 105 engaging a beveled side 106 of a notch 107 provided in the spring pressed rod 98. The upper end of the pin 104 is provided with inclined faces 108 and 109 which are adapted to be engaged by the beveled faces of a trip 110 carried by the tool post slide 24. The trip 110 is preferably adjustably mounted on the tool post slide and may be set in such position that it will engage the pin 104 at any desired point in the crosswise movement of the tool post, thereby to depress the pin 104 and force the rod 98 outwardly against the pressure of the spring 101 as will be readily understood by an inspection of Fig. 5. The direction of rapid traverse of the tool post crosswise of the lathe bed is of course controlled by the hand lever 69 which, as above brought out, may be moved so as to cause the shaft 53 to rotate in either direction.

I will now describe the power feed mechanism for moving the slide 24ᵃ and its apron 25 longitudinally of the lathe bed 21.

Referring for the present to Fig. 8, it will be seen that the pinion 39 which is connected to the worm wheel 36, meshes with an annular gear 111 which is mounted on the periphery of the clutch member 112. The clutch member 112 is rotatably mounted on a shaft 113 which is journaled in suitable bearings provided in the apron 25 and the said clutch part coacts with another clutch part 114, which is keyed to the shaft 113 so as to rotate in unison therewith. The outer end of the shaft 113 is provided with a hand lever 115 rotatably mounted thereon and having cam means, indicated at 116, for effecting operative engagement between the clutch parts 112 and 114. The mechanism 116 is similar to the corresponding cam mechanism above described in connection with the hand lever 80 and clutch members 43 and 44 and hence, need not be again specifically described. A locking pin 117 is provided in the hand lever 115 for locking the same in its up position by entering an aperture 118 provided in a nut 119 which threadedly engages the outer end of a recess 120 in the apron. The pin 117 is urged outwardly into engagement with the aperture 118 by means of a spring 121 and the same may be withdrawn therefrom by merely pulling outwardly on the head 122 until the lever 115 may swing downwardly to disengage the clutch members 112 and 114.

The inner end of the shaft 113 is provided with a pinion 123 which meshes with a rack 124 (Fig. 7) fixedly mounted on the lathe bed in any desirable manner. It will be understood that when the lever 115 is swung upwardly until the pin 117 engages the aperture 118 and the clutch members 112 and 114 thereby are operatively engaged, the shaft 113 will be rotated and the pinion 123 meshing with the stationary rack 124 will cause the tool post apron to be fed longitudinally of the lathe bed.

For effecting rapid traverse of the tool post apron, I provide a vertically extending shaft 125 having a driving connection at its lower end to the power shaft 29 (Fig. 7). This driving connection is indicated at 126 and may be of the same general form as that above described for connecting the shaft 53 with the shaft 29 and hence, will not again be described in detail. The upper end of the shaft 125 is provided with a spiral gear 127 which meshes with a spiral gear 128 keyed to the shaft 113. When the shaft 125 is operatively connected to the shaft 29, by means of the clutch mechanism 126, the shaft 113 which carries the rack engaging pinion 123 will be rotated through the agency of the spiral gears 127 and 128, thereby to impart the desired rapid traverse to the tool post apron. The clutch mechanism 126 is controlled by a hand lever 129 (Fig. 3) and it will be understood that the shaft 125 may be caused to rotate in either direction as desired to propel the apron 25 in either direction along the bed of the lathe.

To automatically stop longitudinal feed movement of slide 24ᵃ, I provide means for automatically forcing the pin 117 out of the aperture 118 so as to permit the hand lever 115 to swing downwardly by gravity to disengage the clutch parts 112 and 114. This mechanism includes a rod 130 (Figs. 4 and 8) which is slidably mounted in and carried by the apron 25. At its inner end the rod 130 is slidably mounted in a bushing 131 disposed in a recess 132 in the apron, and a collar 133 is secured to the rod adjacent the bushing 131. A coiled compression spring 134 is disposed about the rod between the collar 133 and bushing 131 for normally urging the rod to slide outwardly of the apron. The outer end of the rod 130 is fixedly mounted in a head member 135 which is axially slidably and rotatably mounted in the apron 25 as shown at 136 in Fig. 8. The head 135 is provided with a plurality of adjustable screw members 137 which may be locked in any desired position of adjustment by means of set screws such as indicated at 138. The head 135 and rod 130 may be rotated to bring the desired one of the adjustable screw members 137 into longitudinal alignment with a stop bar 139 (Fig. 1) which stop bar may be mounted on the bed of the lathe so as to be longitudinally adjustable to any desired fixed position.

Feed movement of the apron towards the spindle 20 will be automatically stopped by engagement of one of the screw members 137 with the end of the stop bar 139. Such engagement causes the head member 135 and shaft 130 to move inwardly of the apron against the pressure of the spring 134 so that an inclined annular shoulder 140 on the member 135 engaging the beveled end 143 of the plunger 141 will force the plunger outwardly against the pressure of a compression spring 142. Such outward movement of the plunger 141 is effective to unseat the locking pin 117 whereby the lever 115 may swing downwardly by gravity to disengage the clutch mechanism 112 and 114.

Figure 3:
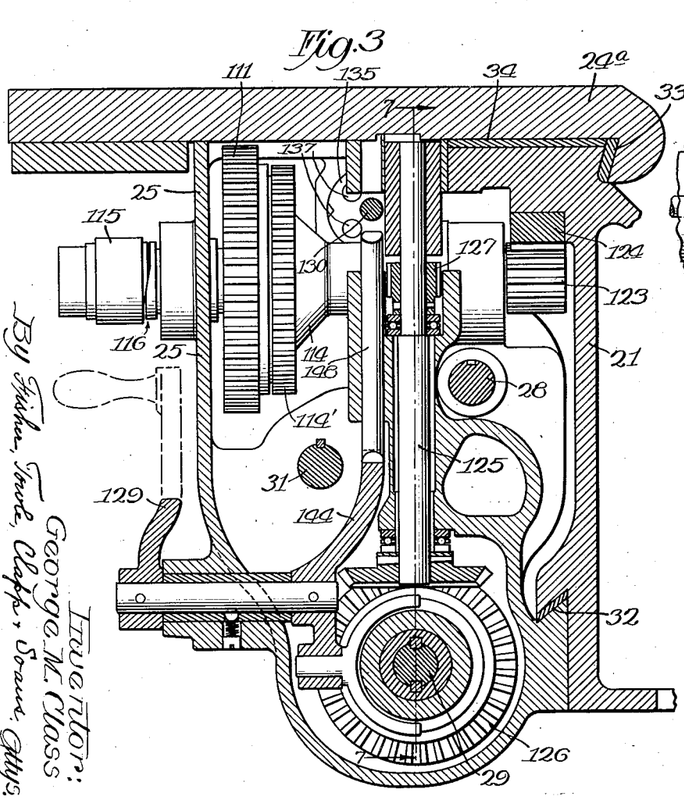
Figure 4:
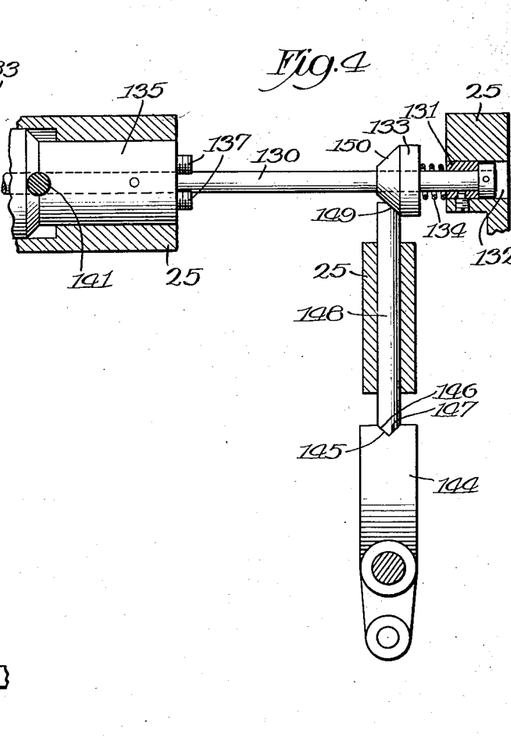
Fig. 4 is a detail showing certain automatic feed stop mechanism and also mechanism for effecting disengagement of the power feed drive when the power drive for effecting rapid traverse of the tool post carrying slide is engaged.

To automatically effect disengagement of the clutch parts 112 and 114 when the clutch mechanism 126 is engaged for effecting rapid traverse of the tool post slide, I provide an arm 144 connected to the hand lever 129 as clearly shown in Figs. 3 and 4, with a V notch 145 in its upper end for acting on the inclined faces 146 and 147 of the lower end of a vertically slidable rod 148. The rod 148 is of course slidably mounted in the apron and the upper end thereof is beveled as shown at 149 for coacting with a beveled face 150 of the collar 133. It will be seen from Fig. 4 that when the arm 144 is swung to either side of the neutral position shown in Fig. 4, the rod 148 will be raised and the rod 130 moved inwardly of the apron to effect movement of the plunger 141 in a manner similar to that above described when one of the screw members 137 engages the stop bar 139. Hence, it will be seen that I have provided automatic means for effecting disengagement of the slide power feed drive mechanism when the rapid traverse mechanism therefor is set into operation. As above noted, in connection with the rapid traverse mechanism for the tool post, its slide may also be propelled in either direction by the rapid traverse power mechanism, this being controlled by the direction of movement of the hand lever 129.

The tool post slide may also be propelled in either direction by means of a hand wheel 151 which is connected to a shaft 152 and which shaft is rotatably mounted in the apron 25 and provided at its inner end with a gear 153. The gear 153 meshes with gear teeth 114' provided on the clutch member 114 so that rotation of the hand wheel 151 is effective to rotate the shaft 113 and the pinion 123 which meshes with the rack 124.

Figures 11, 12:
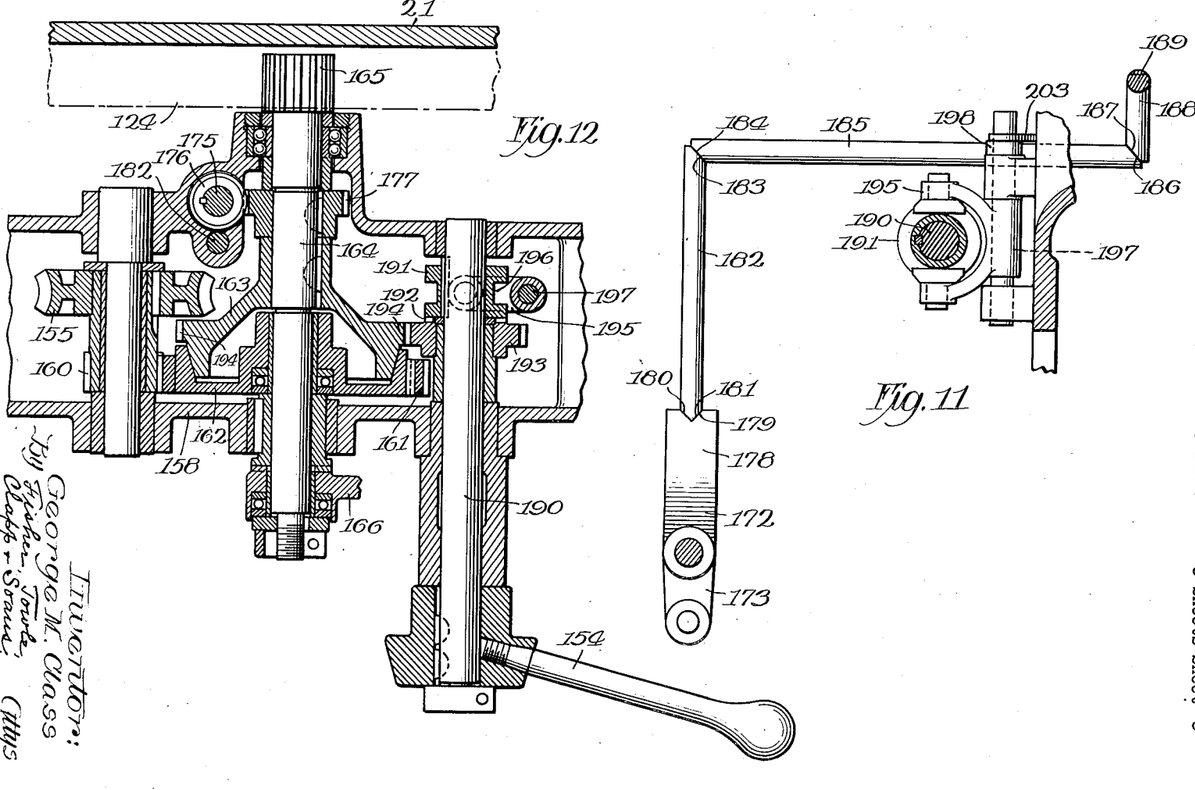
Fig. 12 is a section on the line 12—12 of Figs. 1 and 9.

In turret lathes, provision is often made for moving the turret longitudinally of the bed by means of a hand wheel or spider such as shown at 154 in Figs. 1 and 12, and in the present embodiment of my invention, I provide power means for effecting rapid traverse of the turret towards or from the spindle as well as power feed.

Figure 15:
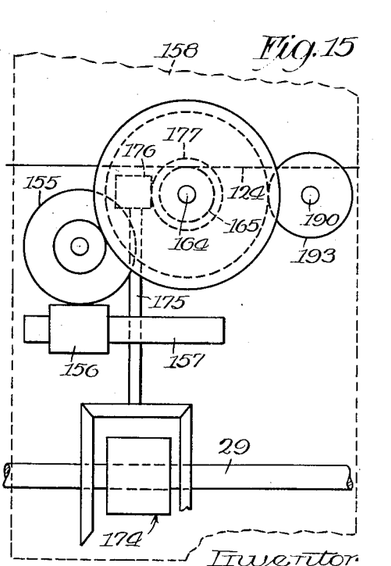

The power feed mechanism in the present application may consist of a worm wheel 155 (Figs. 12 and 15) driven by a worm 156 on a driven shaft 157 which is rotatably mounted in the turret apron 158. The shaft 157 may be driven through the agency of any suitable speed changing drive mechanism as indicated at 159 in Fig. 13 from the driven shaft 28. A pinion 160 rigidly connected to the worm wheel 155 meshes with an annular gear member 161 disposed about the periphery of a clutch member 162 which frictionally engages a coacting clutch member 163 keyed to a shaft 164. The shaft 164 is rotatably mounted in the turret apron 158 and is provided with a pinion 165 on its inner end meshing with the rack 124. A clutch controlling lever 166 is provided for controlling the clutch members 162 and 163 thereby to control the feed movement of the turret apron. The clutch mechanism 162 and 163 and the controlling lever 166 may be of the same type as above described in connection with the power feed mechanism for the tool post slide and hence, further detailed description thereof need not be given. I prefer, however, to provide a spring-pressed pin 167 (Fig. 10) in one end of the hand lever 166 for engaging an aperture 168 in a nut 169 for holding the lever in position for maintaining the clutch parts 162 and 163 in operative engagement.

Figures 9, 10:
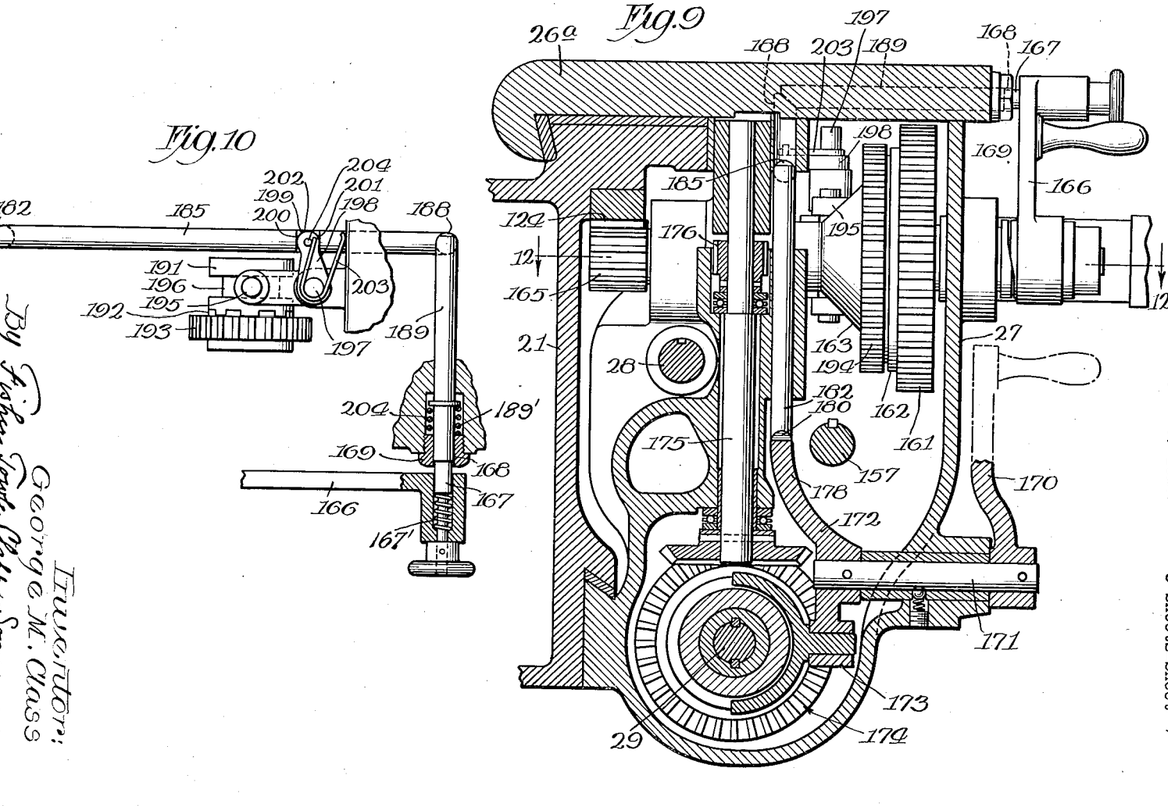
Fig. 9 is a section on the line 9—9 of Fig. 1.
Figs. 10 and 11 are plan and front elevations respectively of certain details appearing in Fig. 9, for automatically disengaging the power feed of the turret slide when the power drive mechanism for effecting rapid traverse thereof is engaged.

According to the present invention, I provide mechanism for effecting power driven rapid traverse of the turret slide and this mechanism may be similar in construction and arrangement to the mechanism for effecting rapid traverse of the tool post slide. As shown in Fig. 9, the mechanism includes a hand lever 170 pinned to a shaft 171 which has an arm 172 secured to its inner end. The arm 172 includes a depending portion 173 which controls clutch mechanism indicated generally at 174, and this clutch mechanism may be of the same construction as the above described clutch mechanism for rotatably connecting the power shaft 29 and the vertically extending shafts 53 and 125. The clutch mechanism 174 is adapted to transmit rotation in either direction to a vertically extending shaft 175 which is rotatably mounted in the turret apron, and to the upper end of which a spiral gear 176 is secured so as to rotate therewith. The spiral gear 176 meshes with a similar gear 177 (Fig. 12) keyed to the shaft 164 thereby to transmit rotation from the vertical shaft 175 to the horizontal shaft 164 and the rack engaging pinion 165 so as to cause the turret slide to move along the lathe bed. The speed of rotation of the power shaft 29 and the ratios of the various gears which transmit rotation to the shafts 175 and 164 is such that the shaft 164 will be rotated at a considerably higher speed than it is rotated by the previously described power feed mechanism. Hence, the latter described mechanism will be effective to cause rapid traverse of the turret slide along the lathe bed.

For effecting disengagement of the turret slide feed driving mechanism when the turret power rapid traverse mechanism is engaged, I provide the arm 172 with an upwardly extending portion 178 (Figs. 9 and 11) which is provided at its upper end with inclined faces forming a V-shaped notch 179 which are adapted to act on the inclined faces 180 and 181 of a vertically slidable rod 182. At its upper end, the vertical rod 182 is provided with an inclined face 183 engaging a similar face 184 on the end of a horizontally slidable rod 185. The opposite end of the rod 185 is provided with an inclined face 186 engaging a similar face 187 on the lower end of a short vertically extending slidable rod 188 which, at its upper end engages the inner end of a rod 189 (Fig. 10) in a similar manner. The rod 189 is slidably mounted in the turret slide and at its outer end enters the aperture 168 so that when moved outwardly it will be effective to force the pin 167 out of the said aperture so as to permit the hand lever 166 to swing downwardly by gravity, thereby to disengage the clutch members 162 and 163. The rod 189 and pin 167 are provided respectively with suitable springs 189' and 167' for normally urging them in the proper direction so as to render them operative as above described. When the hand lever 170 is swung in either direction, it will be understood that the system of rods 182, 185, 188 and 189 will be moved endwise to force the pin 167 out of the aperture 168 so that the feed drive will be disengaged and the rapid traverse driving mechanism may freely move the turret slide along the lathe bed.

As previously mentioned, the spider 154 is provided for permitting movement of the turret slide by hand. For effecting this movement, the spider is keyed to a shaft 190 which is rotatably mounted in the apron and provided adjacent its inner end with a clutch part 191 keyed thereto so as to be axially slidable of the shaft but rotatable therewith. The clutch part 191 is provided with clutch teeth 192 on one end engaging similar clutch teeth on the adjacent end of a pinion gear 193 which is rotatably mounted on the shaft 190. The pinion gear 193 meshes with gear teeth 194 provided on the periphery of the clutch member 163. Provision is made and will be hereinafter described for maintaining the clutch teeth on the clutch member 191 and gear 193 normally in engagement so that when the spider 154 is rotated by hand, rotation of the shaft 190 will be imparted through the pinion 193 and gear 194 to the clutch member 163, shaft 164 and rack engaging pinion 165.

The clutch mechanism 191, 192 and 193 is disengaged when the rapid traverse power driving mechanism is operated, thereby to prevent rapid rotation of the shaft 164 from being imparted to the shaft 190 and spider 154. Rapid rotation of the spider 154 is obviously undesirable since the spider is of relatively large diameter and of heavy weight, and would be apt to cause serious injury to a person, should the latter accidentally be struck thereby when the spider was rotating at high speed.

For preventing rotation of the spider when the rapid traverse mechanism is engaged, I provide means for automatically disengaging the clutch mechanism 191, 192 and 193 when the rapid traverse power driving mechanism is operated. This automatic mechanism includes a fork 195 (Figs. 10 and 11) engaging an annular groove 196 provided in the clutch part 191 and mounted on a vertically disposed shaft 197 rotatably mounted in the apron. The upper end of the shaft 197 is provided adjacent its upper end with an arm 198 having a substantially circular head portion 199 engaging the opposite faces 200 and 201 formed in the rod 185 by a transverse groove 202 provided therein. It will be seen that when the rod 185 is moved endwise as a result of moving the hand lever 170 and arm 172, the arm 198 will be shifted so as to rock the shaft 197 and the fork 195. When the fork 195 is so rocked, the clutch part 191 is disengaged from the clutch teeth of the gear 193 so that the gear 193 may rotate freely on the shaft 190. Hence, rotation of the shaft 164 effected by the rapid traverse power driving mechanism will not be imparted to the shaft 190 and spider 154.

A spring 203 disposed about the upper end of the shaft 197 and exerting pressure between a part of the turret apron and a pin 204 projecting from the arm 198 serves to normally maintain the clutch part 191 in engagement with the clutch teeth of the gear 193. The said spring 203 also serves to assist the spring 189' to return the system of rods to their neutral position when the hand lever 170 is restored to neutral position.

Figure 5:
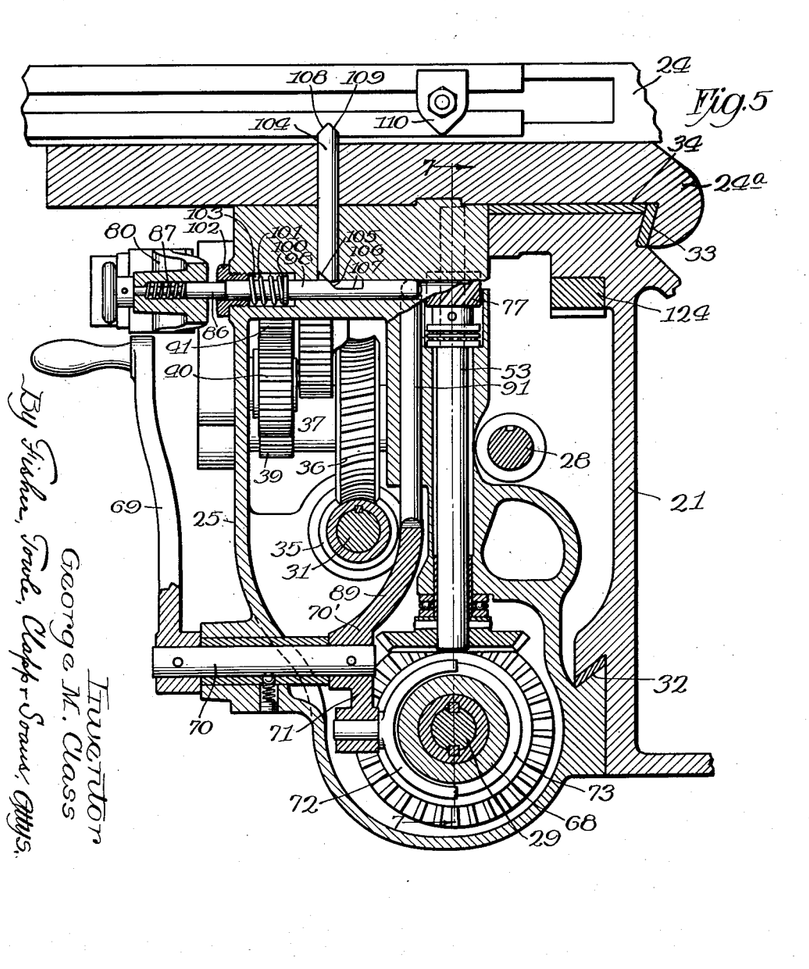
Fig. 5 is a section on the line 5—5 of Fig. 1.
Figure 6:
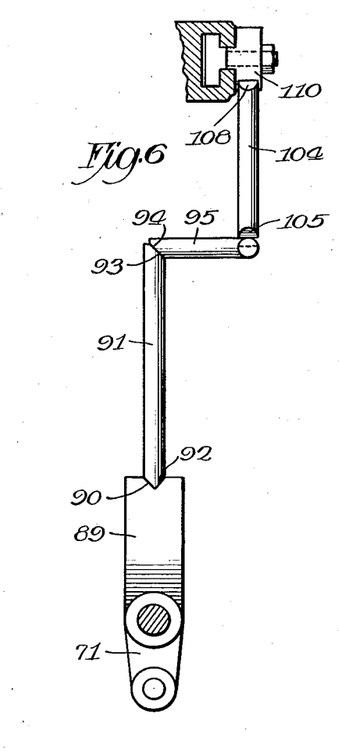
Fig. 6 is a front elevation of certain details for automatically disengaging the power for effecting cross feed of the tool post when the power drive for effecting rapid crosswise traverse of the tool post is engaged.

From the above description it will be understood that I have provided a lathe in which the tool post cross-slide 24 is provided with both hand and power feeds and also power driven rapid traverse mechanism, and in which the tool post main slide 24ª and the turret slide 26ª are provided with both hand and power feed mechanism and also power driven rapid traverse mechanism. The speed of power driven feed for the tool post main slide and turret slide may be controlled by the change gear mechanisms 30 and 159 respectively, which as above noted, may be of any suitable construction. The gear mechanisms 30 and 159 are of course, connected to the shaft 28 so that they may slide axially thereof with the respective slides while being rotated. The clutch mechanisms which connect the power shaft 29 with the shafts 53 and 125 of the tool post apron and the shaft 175 of the turret apron, are also mounted on the power shaft 29 so as to be slidable axially thereof while being rotated thereby so as to permit the longitudinal movement of the respective slides. As indicated in Figs. 3, 5 and 9, these clutch mechanisms are keyed to the shaft 29 so as to render the shaft effective to impart rotation to the clutch mechanism while permitting the necessary sliding movement along the shaft.

Various changes may be made in the form, construction and arrangement of parts without departing from the spirit of the invention, the scope of which should be determined by reference to the following claims which should be construed as broadly as possible consistently with the state of the art.

I claim—

1. In a lathe, the combination of a bed, a tool-carrying slide mounted on said bed, power means, including a clutch, for effecting feed movement of said slide, a manually operated clutch-operating lever, a lock holding said lever in clutch-engaged position, power means, including a clutch, for effecting rapid traverse of said slide, a manually operated clutch-operating lever, and means actuated by said last-named lever when swung to clutch-engaging position for releasing said lock.

2. In a lathe, the combination of a bed, a tool-carrying slide mounted on said bed, power means, including a clutch, for effecting feed movement of said slide, a manually operated clutch-operating lever, a spring-actuated locking pin holding said lever in clutch-engaged position, power means, including a clutch, for effecting rapid traverse of said slide, a manually operated clutch-operating lever, and means actuated by said last-named lever when swung to clutch-engaging position for retracting said locking pin.

3. In a lathe, the combination of a bed, a tool-carrying slide mounted on said bed, an apron fast with said slide, power means, including a clutch, for effecting feed movement of said slide, a manually operated clutch-operating lever, a spring-actuated locking pin mounted in said lever adapted to engage a hole in said apron to hold said lever in clutch-engaged position, power means, including a clutch for effecting rapid traverse of said slide, a manually operated clutch-operating lever, and a system of endwise movable rods having cooperating cam ends slidably mounted in said apron and actuated by said last-named lever, to force said locking pin out of said hole and thereby release said first-named lever.

4. In a lathe, the combination of a bed, a tool post main slide mounted on said bed, a tool post cross-slide mounted on said main slide, power means, including a clutch, for effecting feed movement of said cross-slide, a manually operated clutch-operating lever, a lock holding said lever in clutch-engaged position, power means, including a clutch, for effecting rapid traverse of said cross-slide, a manually operated clutch-operating lever, and means actuated by said last-named lever when swung to clutch-engaging position for releasing said lock.

5. In a lathe, the combination of a bed, a tool-carrying slide mounted on said bed, power means, including a clutch, for effecting feed movement of said slide, a manually operated clutch-operating lever, a lock holding said lever in clutch-engaged position, power means, including a clutch, for effecting rapid traverse of said slide, a manually operated clutch-operating lever, means actuated by said last-named lever when swung to clutch-engaging position for releasing said lock, and means, including an adjustable member on said slide, for automatically actuating said lock-releasing means at any predetermined point in the feed movement of said slide.

6. In a lathe, the combination of a bed, a tool post main slide mounted on said bed, a tool post cross-slide mounted on said main slide, power means, including a clutch, for effecting feed movement of said cross-slide, a manually operated clutch-operating lever, a lock holding said lever in clutch-engaged position, power means, including a clutch, for effecting rapid traverse of said cross-slide, a manually operated clutch-operating lever, means actuated by said last-named lever when swung to clutch-engaging position for releasing said lock, and means, including an adjustable member on said cross-slide, for automatically actuating said lock-releasing means at any predetermined point in the feed movement of said cross-slide.

7. In a lathe, the combination of a bed, a tool-carrying slide mounted on said bed, an apron fast with said slide, power means, including a clutch, for effecting rapid traverse of said slide, a manually operated clutch-operating lever, manually operable means, including a hand wheel and a clutch mounted in said apron for moving said slide along said bed, said manually operable means including a part constituting a part of said rapid traverse power means, and a system of endwise movable rods formed with cooperating cam ends slidably mounted in said apron and actuated by said clutch-operating lever to disconnect said last-named clutch and thereby stop rotation of said hand wheel when said rapid traverse means is put in operation.

8. In a lathe, the combination of a bed, a tool-carrying slide mounted on said bed, an apron fast with said slide, power means, including a clutch, for effecting feed movement of said slide, a manually operated clutch-operating lever, a lock holding said lever in clutch-engaged position, power means, including a clutch, for effecting rapid traverse of said slide, a manually operated clutch-operating lever, manually operable means, including a hand wheel and a clutch, mounted in said apron for moving said slide along said bed, said manually operable means including a part of said rapid traverse power means, means actuated by said last-named lever when swung to clutch-engaging position for releasing said lock, and means actuated by said lock-releasing means for rendering idle said last-named clutch, whereby when the rapid traverse movement is thrown in and the feed movement is thrown out said hand wheel is disconnected from said rapid traverse power means.

GEORGE M. CLASS.